(12) United States Patent
Unnerstall

(10) Patent No.: US 10,504,086 B2
(45) Date of Patent: Dec. 10, 2019

(54) SYSTEMS AND METHODS FOR PROVIDING A TAILORED USER EXPERIENCE AT A SELF-SERVICE KIOSK

(71) Applicant: MasterCard International Incorporated, Purchase, NY (US)

(72) Inventor: Richard Unnerstall, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 432 days.

(21) Appl. No.: 15/148,557

(22) Filed: May 6, 2016

(65) Prior Publication Data

US 2017/0323278 A1  Nov. 9, 2017

(51) Int. Cl.

| | | |
|---|---|---|
| *G06Q 20/18* | (2012.01) | |
| *G06Q 50/12* | (2012.01) | |
| *G06Q 20/40* | (2012.01) | |
| *G06Q 10/08* | (2012.01) | |
| *G06Q 30/02* | (2012.01) | |
| *G06Q 20/20* | (2012.01) | |
| *G07F 7/00* | (2006.01) | |
| *G07F 11/00* | (2006.01) | |

(52) U.S. Cl.
CPC ........... *G06Q 20/18* (2013.01); *G06Q 10/087* (2013.01); *G06Q 20/20* (2013.01); *G06Q 20/4016* (2013.01); *G06Q 20/40145* (2013.01); *G06Q 30/0206* (2013.01); *G06Q 50/12* (2013.01); *G07F 7/00* (2013.01); *G07F 11/002* (2013.01)

(58) Field of Classification Search
CPC ................. G06Q 20/18; G06Q 10/087; G06Q 20/40145; G06Q 20/409
USPC .......... 705/15, 16, 21, 22; 704/275; 340/618
See application file for complete search history.

(56) References Cited

U.S. PATENT DOCUMENTS

| | | | | |
|---|---|---|---|---|
| 7,769,638 B1 * | 8/2010 | Mollett | ................ | G06Q 20/02 235/383 |
| 7,831,475 B2 * | 11/2010 | Baril | ..................... | G06Q 20/20 705/16 |
| 8,224,700 B2 * | 7/2012 | Silver | .................... | G06Q 10/02 235/379 |
| 8,608,059 B1 * | 12/2013 | Miller | ................ | G06Q 20/3274 235/379 |
| 8,814,804 B2 | 8/2014 | Walden et al. | | |
| 9,152,956 B1 | 10/2015 | Habash | | |
| 2001/0011680 A1 | 8/2001 | Soltesz et al. | | |
| 2003/0146821 A1 * | 8/2003 | Brandt | ................... | G06O 20/04 340/10.1 |

(Continued)

*Primary Examiner* — Vanel Frenel

(57) ABSTRACT

Embodiments of the disclosure enable a tailored user experience to be provided. A kiosk system includes a scanner component configured to identify biometric data; a metric component configured to communicate with the scanner component to identify user identifier data based on the biometric data; a transaction component configured to communicate with the metric component to identify a financial account corresponding to the identified user identifier data, and generate a request for authorization for a financial transaction using the identified financial account; and a dispenser component configured to communicate with the transaction component to determine whether to dispense the beverage. Aspects of the disclosure provide for tailoring a user experience based on various factors including a user metric and/or an account metric.

20 Claims, 7 Drawing Sheets

(56) References Cited

U.S. PATENT DOCUMENTS

| | | | |
|---|---|---|---|
| 2005/0182681 A1* | 8/2005 | Bruskotter | G06Q 20/204 705/15 |
| 2005/0200490 A1* | 9/2005 | Teller | B67D 1/1405 340/618 |
| 2007/0239549 A1 | 10/2007 | LaFauci et al. | |
| 2007/0288319 A1* | 12/2007 | Robinson | G06Q 30/02 705/14.25 |
| 2008/0033835 A1* | 2/2008 | Philyaw | G06F 17/30876 705/26.1 |
| 2008/0283594 A1* | 11/2008 | Unbehagen | G06Q 20/12 235/380 |
| 2012/0022890 A1 | 1/2012 | Williams et al. | |
| 2012/0078737 A1* | 3/2012 | Kulakowski | G06Q 20/20 705/16 |
| 2014/0244409 A1* | 8/2014 | Nathanel | G06Q 50/12 705/15 |
| 2015/0134347 A1 | 5/2015 | Faurie et al. | |

\* cited by examiner

SYSTEMS AND METHODS FOR PROVIDING A TAILORED USER EXPERIENCE AT A SELF-SERVICE KIOSK

FIELD OF THE DISCLOSURE

The subject matter described herein relates generally to dispensing systems and, more specifically, to a smart self-service kiosk that provides customized or tailored user experiences.

BACKGROUND

Service-based industries are typically labor intensive. For example, a customer may request that a vendor provide a service (e.g., deliver a good). In turn, the vendor may fulfill the request by identifying the good, preparing the good for delivery or consumption, and ultimately delivering the good to the customer for consumption. The good may be a controlled product (e.g., alcohol, tobacco, prescription medicine, firearm) for which an age or identity of the customer is verified before or upon delivering the good to the customer. Accordingly, the process of delivering a good may be tedious, time consuming, and/or error prone.

To address some of these issues, at least some goods may be delivered using an automated system, such as a vending machine. At least some known vending machines provide an established array of goods for each customer. That is, for at least some known vending machines, the user experience is not tailored or customized to a customer, but rather is the same or at least similar across most or all customers.

SUMMARY

Embodiments of the disclosure enable a kiosk system to dispense a beverage. The kiosk system includes a scanner component that identifies biometric data, a metric component that communicates with the scanner component to identify user identifier data based on the biometric data, a transaction component that communicates with the metric component to identify a financial account corresponding to the user identifier data, and generates a request for authorization for a financial transaction using the financial account, and a dispenser component that communicates with the transaction component to determine whether to dispense the beverage.

In another aspect, a computer-implemented method is provided for dispensing a beverage. The computer-implemented method includes identifying biometric data at a scanner component, using the biometric data to identify a user metric, determining whether the user metric satisfies a predetermined threshold, generating a request for authorization for a financial transaction on condition that the user metric satisfies the predetermined threshold, and dispensing the beverage on condition that the financial transaction is authorized.

In yet another aspect, a system is provided for dispensing a beverage. The system includes one or more processors, and one or more computer-readable storage devices storing computer-executable instructions and data associated with one or more cardholder accounts. Upon execution by at least one processor, the computer-executable instructions cause the at least one processor to identify scan data, use the scan data to identify a user metric, identify a cardholder account from the one or more cardholder accounts based on the scan data on condition that the user metric satisfies a predetermined threshold, determine whether to authorize a financial transaction associated with the beverage using the cardholder account, and transmit an instruction to dispense the beverage on condition that the financial transaction is authorized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
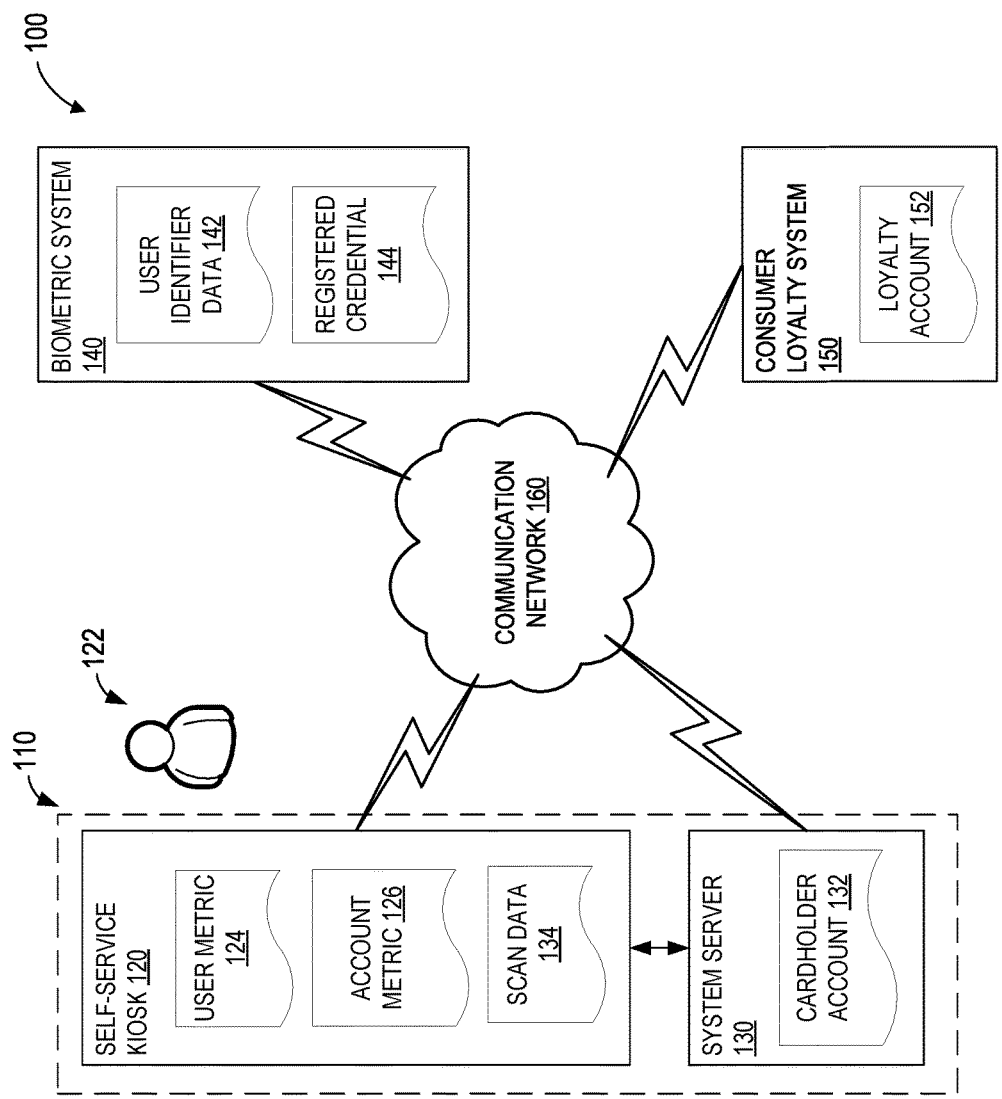
FIG. 1 is a block diagram illustrating example systems for providing a customized or tailored user experience.

The subject matter described herein relates to a self-service kiosk that may be used to provide a customized or tailored user experience. The self-service kiosk may provide, for example, customized or tailored goods or services to a consumer. Embodiments of the disclosure may identify biometric data associated with the consumer, use the biometric data to identify a user metric, determine whether the user metric satisfies one or more thresholds, generate a request for authorization for a financial transaction associated with a beverage, and dispense the beverage.

Aspects of the disclosure provide for a computing system that processes one or more financial transactions in an environment including a plurality of devices coupled to each other via a network (e.g., a local area network, a wide area network, the Internet). For example, a self-service kiosk may be used to communicate with other computing systems (e.g., a biometric system, a financial transaction processing device, a consumer loyalty system) to provide customized or tailored goods or services to a consumer. The kiosk may identify scan data, use the scan data to identify a user metric, identify a cardholder account from one or more cardholder accounts based on the scan data, determine whether to authorize a financial transaction using the cardholder account, and transmit an instruction to dispense the beverage. In this manner, the user experience may be customized or tailored based on any combination of factors including a user metric (e.g., age, user preference) and/or an account metric (e.g., quantity of goods or services provided, account balance, available credit line).

The systems and processes described herein may be implemented using computer programming or engineering techniques including computer software, firmware, hardware or a combination or subset thereof. At least one technical problem with known dispensing systems is that an array of available goods presented to a consumer may not be customized or tailored to the consumer. If the array is tailored to the consumer, another technical problem with known dispensing systems is that tailoring the array may be tedious, time consuming, and/or error prone. The embodiments described herein address at least these technical problems. For example, by processing financial transactions in the manner described in this disclosure, some embodiments improve a user experience in a financial transaction by using data (e.g., user metric, account metric) that may be indicative of purchasing preferences, tendencies, or capabilities of a consumer to tailor a user experience to the consumer. In this manner, the embodiments described herein may facilitate achieving a balance between convenience to the cardholder and security from fraud. Additionally, some embodiments may reduce overhead costs, manage inventory to facilitate reducing spoilage, improve processor security and/or data transmission security by processing one or more financial transactions using biometric data, improve user efficiency and/or user interaction performance by using biometric data to communicate with one or more computing systems (e.g., a biometric system, a financial transaction processing device, a consumer loyalty system), and/or reduce error rate by automating the analysis and processing of financial transactions. In some embodiments, the subject matter described herein may facilitate increasing processor speed, reducing processor load, improving communication between systems, reducing network bandwidth usage, and/or improving operating system resource allocation.

The technical effect of the systems and processes described herein is achieved by performing at least one of the following operations: a) detecting an object; b) scanning for biometric data; c) identifying the biometric data; d) identifying user identifier data based on the biometric data; e) identifying a user metric; f) determining whether the user metric satisfies a predetermined threshold; g) identifying a financial account corresponding to the user identifier data; h) identifying an account metric; i) determining whether the account metric satisfies a predetermined threshold, j) identifying a set of beverage indicators for presentation; k) generating a request for authorization for a financial transaction using the financial account; l) determining whether to dispense a beverage; and/or m) dispensing the beverage.

FIG. 1 is a block diagram illustrating an example environment 100 for providing a customized or tailored user experience. The environment 100 includes a system 110 including a self-service kiosk 120 that is configured to provide a service. For example, a consumer 122 may use the kiosk 120 to purchase one or more goods and/or be provided with the purchased goods at the kiosk 120. As used herein, a kiosk may be understood to refer to a structure that includes a computing system, allows a consumer 122 to purchase one or more goods, and/or provides one or more goods to the consumer 122. The kiosk 120 may be located in a high-traffic area, such as a shopping mall, a department store, an office building, a restaurant, an airport, a casino, a stadium or arena, an amusement park, a cruise ship, and the like.

In some embodiments, a status of the kiosk 120 (e.g., pricing, inventory) may be monitored. For example, one or more inventory levels associated with one or more goods may be monitored, and at least one price associated with at least one good may be dynamically adjusted based on a corresponding inventory level. The kiosk 120 is configured to dispense or serve a good to the consumer 122 based on one or more user metrics 124 (e.g., age, user preference), one or more account metrics 126 (e.g., quantity of goods or services provided, account balance, available credit line) associated with the consumer 122, and/or any other factor (e.g., preference of an entity associated with the kiosk 120). In this manner, a customized array or set of goods may be identified for the consumer 122 based on one or more user metrics 124 and/or account metrics 126, and the customized set of goods may be available for purchase at a customized schedule of prices (e.g., by adjusting prices based on inventory level). In some embodiments, the kiosk 120 communicates with one or more computing devices or data storage devices to determine or identify at least one user metric 124 and/or account metric 126.

In some embodiments, the system 110 includes a server device or system server 130 coupled to the kiosk 120. Alternatively, the system server 130 may be a remote system that is coupled to the kiosk 120. The system server 130 includes, stores, or has access to one or more financial or cardholder accounts 132 associated with one or more users. For example, the system server 130 may be a financial transaction processing device configured to process one or more financial transactions using at least one cardholder account 132. As used herein, the terms "server device" and "system server" may be used interchangeably, and may be understood to mean a single computing device or a plurality of interconnected computing devices that operate together to perform a particular function. That is, the system server 130 may be contained within a single hardware unit or be distributed among several or many different hardware units, including in the "cloud."

The kiosk 120 is configured to communicate with the system server 130 to determine or identify, from the one or more cardholder accounts 132, a cardholder account 132 associated with the consumer 122. For example, the kiosk 120 may receive or identify scan data 134 (e.g., first biometric data) associated with the consumer 122, and communicate with the system server 130 to identify a cardholder account 132 associated with the consumer 122 based on the scan data 134. Scan data 134 may include, for example, a photograph, a fingerprint, an iris scan, a retinal scan, a voice print, an ear scan, a deoxyribonucleic acid (DNA) profile, or any other features that may be used to identify the consumer 122.

In some embodiments, the kiosk 120 and/or system server 130 is configured to communicate with a biometric system 140 that includes, stores, or has access to user identifier data 142 associated with one or more users to facilitate identifying a cardholder account 132 associated with the consumer 122. For example, the kiosk 120 and/or system server 130 may transmit scan data 134 associated with the consumer 122 to the biometric system 140, receive user identifier data 142 corresponding to the scan data 134 from the biometric system 140, and identify a cardholder account 132 corresponding to the user identifier data 142. The cardholder account 132 may be used to determine or identify at least one user metric 124 and/or account metric 126 based on cardholder data (e.g., cardholder account identifier, demographic data, transaction history data, account balance, available credit line) associated with the cardholder account 132. User identifier data 142 may include, for example, a name, an address, a telephone number, an email address, a government-issued identifier, or any other data that may be used to identify the consumer 122.

In some embodiments, the biometric system 140 includes, stores, or has access to one or more registered credentials 144 (e.g., second biometric data) authenticated or verified to be associated with one or more users. The biometric system 140 is configured to determine or identify, from the one or more registered credentials 144, a registered credential 144 associated with the consumer 122. For example, the biometric system 140 may receive or identify scan data 134 associated with the consumer 122, compare the scan data 134 with one or more registered credentials 144, and identify a registered credential 144 corresponding to the scan data 134. The identified registered credential 144 may be used to determine or identify user identifier data 142 based on a user associated with the registered credential 144 and the user identifier data 142. In some embodiments, the biometric system 140 is associated with a government agency that includes, stores, and/or has access to various types of data, including demographic data, probation condition data, and/or criminal record data. Alternatively, the biometric system 140 may be associated with an entity associated with the kiosk 120 and/or an entity associated with the system server 130.

Additionally or alternatively, the kiosk 120 and/or system server 130 may communicate with a consumer loyalty system 150 that includes, stores, or has access to one or more loyalty accounts 152 associated with one or more users to determine or identify, from the one or more loyalty accounts 152, a loyalty account 152 associated with the consumer 122. For example, the kiosk 120 and/or system server 130 may transmit user identifier data 142 associated with the consumer 122 to the consumer loyalty system 150 and receive loyalty account data (e.g., a loyalty account identifier, demographic data, transaction history data, rewards history data) corresponding to the user identifier data 142 from the consumer loyalty system 150. In some embodiments, the loyalty account 152 is used to determine or identify at least one user metric 124 and/or account metric 126 based on loyalty account data associated with the loyalty account 152.

In some embodiments, the kiosk 120 generates a request for authorization for a financial transaction using the cardholder account 132, and transmits the request for authorization to the system server 130. The system server 130 is configured to process the request for authorization, and determine whether to authorize the financial transaction. Upon authorizing the financial transaction, the system server 130 may transmit, to the kiosk 120, an instruction to dispense or serve a good associated with the financial transaction.

The environment 100 includes one or more communication networks 160 that enable data to be transferred between a plurality of computing devices (e.g., kiosk 120, system server 130, biometric system 140, consumer loyalty system 150) coupled to the communication network 160. Example communication networks 160 include a cellular or mobile network and the Internet. Alternatively, the communication network 160 may be any communication medium that enables the environment 100 to function as described herein including, for example, a personal area network (PAN), a local area network (LAN), and/or a wide area network (WAN).

Figure 2:
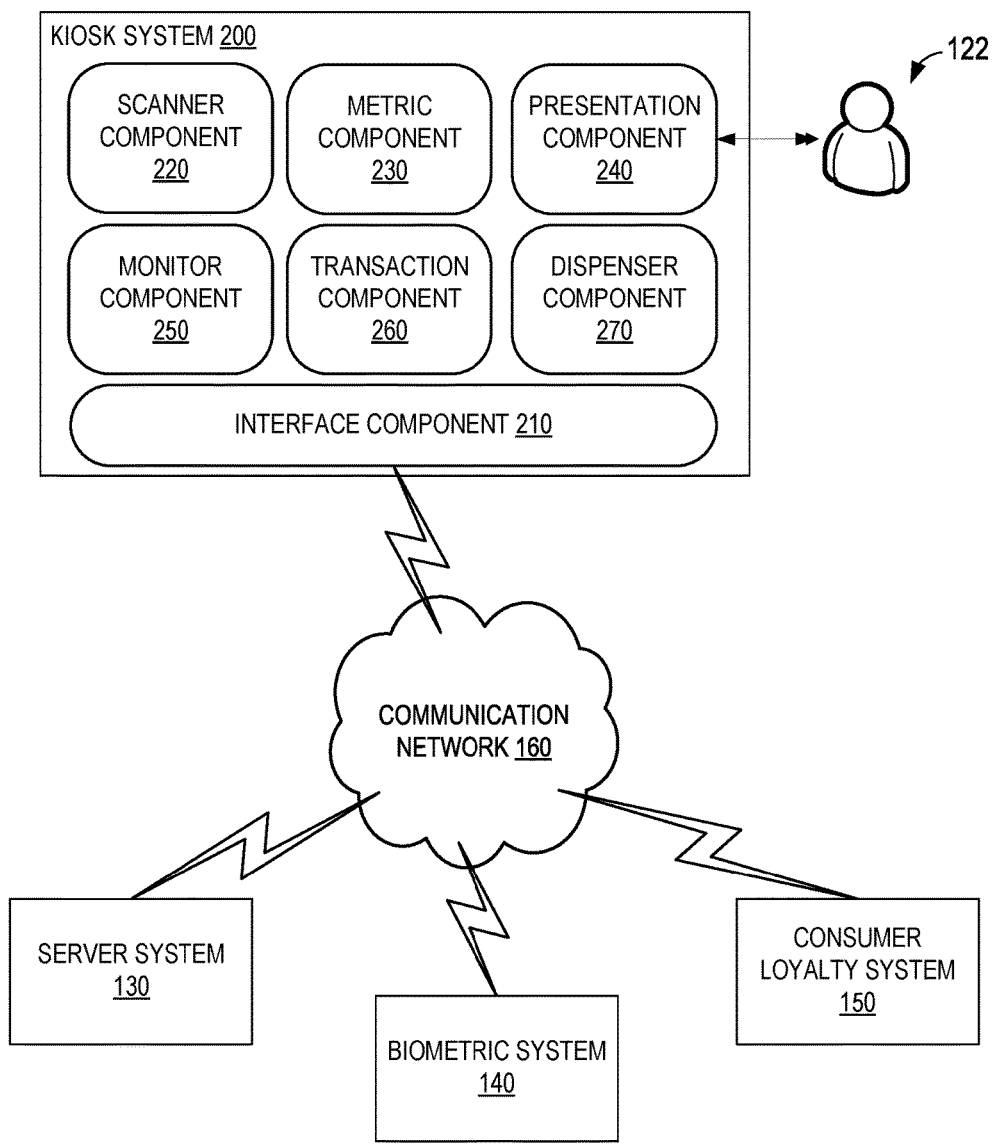
FIG. 2 is a block diagram illustrating an example components that may be used to provide a customized or tailored user experience.

FIG. 2 is a block diagram illustrating an example kiosk system 200 (e.g., system 110, self-service kiosk 120) that may be used to provide a customized or tailored user experience in the environment 100 (shown in FIG. 1). For example, the kiosk system 200 may be configured to dispense or serve a controlled product (e.g., alcohol, tobacco, prescription medicine, firearm, mature content, etc.) and/or a product for a recommended audience (e.g., media including movies, music, video games, etc.). In some embodiments, the kiosk system 200 authenticates or verifies a characteristic of a consumer 122 (e.g., age, gender, identity) before or upon providing the tailored user experience to the consumer 122. To enable the kiosk system 200 to provide a customized or tailored user experience, the kiosk system 200 may include an interface component 210, a scanner component 220, a metric component 230, a presentation component 240, a monitor component 250, a transaction component 260, and/or a dispenser component 270.

The interface component 210 enables the kiosk system 200 to receive data from and/or transmit data to one or more other computing devices (e.g., system server 130, biometric system 140, consumer loyalty system 150) via the communication network 160. For example, the interface component 210 may be coupled to the scanner component 220, the metric component 230, the presentation component 240, the monitor component 250, the transaction component 260, and/or the dispenser component 270 to facilitate communication between another computing device and the scanner component 220, the metric component 230, the presentation component 240, the monitor component 250, the transaction component 260, and/or the dispenser component 270. In some embodiments, the interface component 210 facilitates communication between the scanner component 220, the metric component 230, the presentation component 240, the monitor component 250, the transaction component 260, and/or the dispenser component 270.

The scanner component 220 enables the kiosk system 200 to identify or receive scan data 134 (e.g., first biometric data) associated with the consumer 122. For example, the scanner component 220 may detect an object (e.g., a cup, a sleeve configured to retain a cup, a payment card, a computing device, a semiconductor chip), and communicate with the object to obtain scan data 134 made available by or stored at the object. In one embodiment, a cup includes a scanner device that detects a feature of the consumer 122, generates scan data 134 corresponding to the detected feature, and uses one or more semiconductor chips to transmit the scan data 134 to the scanner component 220 via radio frequency (RF) waves (e.g., Europay, MasterCard, and Visa (EMV)-compatible communications, near field communication (NFC)-compatible communications) for secure data communication with the scanner component 220. Additionally or alternatively, the scanner component 220 may detect the object, search or scan the object for a feature (e.g., face, fingerprint, iris, retina, voice, sound, ear, DNA profile), and generate scan data 134 based on the feature.

The metric component 230 enables the kiosk system 200 to identify various sources (e.g., kiosk system 200, system server 130, biometric system 140, consumer loyalty system 150) for obtaining data associated with the consumer 122. In some embodiments, the metric component 230 communicates (e.g., via the interface component 210) with the scanner component 220 and a biometric system 140 to determine or identify user identifier data 142 associated with the consumer 122. For example, the metric component 230 may receive scan data 134 from the scanner component 220, and transmit the scan data 134 to the biometric system 140 for obtaining the user identifier data 142 from the biometric system 140.

The metric component 230 is configured to use the user identifier data 142 to determine or identify one or more user metrics 124 and/or account metrics 126 associated with the consumer 122. In some embodiments, the metric component 230 communicates (e.g., via the interface component 210) with the system server 130, biometric system 140, and/or consumer loyalty system 150 to identify a cardholder account 132 and/or loyalty account 152 for use in a financial transaction. For example, the metric component 230 may receive user identifier data 142 from the biometric system 140, and transmit the user identifier data 142 to the system server 130 and/or consumer loyalty system 150 for obtaining a cardholder account 132 and/or loyalty account 152, respectively, from the system server 130 and/or consumer loyalty system 150.

One or more user metrics 124 and/or account metrics 126 may be determined or identified based on various data associated with the cardholder account 132 and/or loyalty account 152, including, for example, biometric data, demographic data, cardholder data, and/or loyalty account data. In some embodiments, the kiosk system 200 includes, stores, or has access to one or more tables associated with various types of beverages, pours (e.g., amount), and/or prices to facilitate determining or identifying at least one user metric 124 and/or account metric 126.

In one embodiment, one or more user metrics 124 (e.g., age, gender, body weight, estimated blood alcohol content (BAC)) and/or account metrics 126 (e.g., quantity of alcoholic beverages, period of time) are calculated from data stored at the kiosk system 200 and/or obtained from one or more computing devices coupled to the kiosk system 200, including the system server 130, the biometric system 140, and/or a consumer loyalty system 150. One formula for calculating an estimated BAC is as follows:

$$\frac{0.9672 \cdot SD}{BW \cdot Wt} - (0.017 \cdot DP) \qquad \text{(Eq. 1)}$$

where SD is the quantity of alcoholic beverages, BW is a body water constant based on gender (e.g., 0.58 for men, 0.49 for women), Wt is body weight in kilograms, and DP is the drinking period in hours. The quantity of alcoholic beverages (SD) and corresponding drinking period (DP) may be determined or identified, for example, based on transaction history data. The age, gender, and body weight (Wt) may be determined or identified, for example, based on demographic data.

Additionally or alternatively, a user metric 124 may be obtained from an alcohol detector device (e.g., breathalyzer) coupled to or included in the kiosk system 200. The alcohol detector device may be configured to receive a fluid (e.g., breath, saliva, perspiration, urine, blood) associated with the consumer 122, detect an amount of alcohol (e.g., ethanol) in the fluid, and generate an estimated BAC based on the detected amount of alcohol.

The presentation component 240 enables the kiosk system 200 to present information to the consumer 122 and/or to allow the consumer 122 to provide user input. In some embodiments, the presentation component 240 determines or identifies a user metric 124 and/or account metric 126, and selectively allows the consumer 122 to access (or selectively restricts the consumer from accessing) one or more goods based on the user metric 124 and/or account metric 126. For example, the user metric 124 and/or account metric 126 may be compared with a predetermined threshold, and a set or subset of goods may be identified or selected from a plurality of goods based on whether the predetermined threshold is satisfied. In this manner, the consumer 122 may identify or select at least one good from a subset of goods that is customized or tailored to the consumer 122 (e.g., a customized menu).

In some embodiments, the presentation component 240 identifies or selects, from a plurality of indicators corresponding to the plurality of goods, a set of indicators corresponding to the one or more goods that may be provided to the consumer 122 for presentation using the presentation component 240. Alternatively, the set of indicators may be selected based on any combination of user metrics 124, account metrics 126, and/or predetermined thresholds that enable the kiosk system 200 to function as described herein. In one embodiment, a set of indicators corresponding to a set of goods (e.g., alcoholic beverages and/or non-alcoholic beverages) are presented when a user metric 124 and/or account metric 126 satisfies a predetermined threshold (e.g., an age of the consumer 122 is equal to or greater than a predetermined age, an estimated BAC of the consumer 122 is less than a predetermined BAC, a quantity of alcoholic beverages provided is less than a predetermined quantity), and a set of indicators corresponding to another set of goods (e.g., non-alcoholic beverages) are presented when the user metric 124 and/or account metric 126 does not satisfy the predetermined threshold (e.g., the age of the consumer 122 is less than the predetermined age, the estimated BAC of the consumer 122 is greater than or equal to the predetermined BAC, the quantity of alcoholic beverages provided is greater than or equal to the predetermined quantity). Accordingly, in this embodiment, the presentation component 240 does not present an indicator corresponding to an alcoholic beverage unless each predetermined threshold is satisfied.

Additionally or alternatively, an indicator corresponding to a good associated with a price that is less than or equal to an account balance or available credit line of a cardholder account 132 associated with a consumer 122 may be presented using the presentation component 240 and/or an indicator corresponding to a good associated with a price that is greater than the account balance or available credit line may not be presented. In this manner, the consumer 122 may be restricted from purchasing a good that the consumer 122 cannot afford.

The monitor component 250 enables the kiosk system 200 to monitor a status of the kiosk system 200. In some embodiments, at least one good provided or available at the kiosk system 200 is monitored to enable the subset of goods that is customized or tailored to the consumer 122 (e.g., the customized menu) to be further customized or tailored based on the status of the kiosk system 200. For example, when an inventory level associated with a good satisfies a predetermined threshold (e.g., the inventory level is equal to or greater than a predetermined quantity), the good may be provided or made available at a first price, and when the inventory level does not satisfy the predetermined threshold (e.g., the inventory level is less than the predetermined quantity), the good may not be provided or made available at a second price different from the first price. In this manner, the subset of goods may be tailored to increase profits and/or manage inventory by dynamically adjusting pricing and/or selectively making at least some goods (e.g., popular goods, goods associated with an inventory level that is at or near zero) available to the consumer 122.

The transaction component 260 enables the kiosk system 200 to enter into one or more financial transactions. The transaction component 260 is configured to generate a request for authorization for a financial transaction using the cardholder account 132, and transmit the request for authorization to the system server 130. In some embodiments, the request for authorization is transmitted to the system server 130 on condition that a user metric 124 and/or account metric 126 satisfies a predetermined threshold. For example, the request for authorization may not be generated and/or transmitted unless each predetermined threshold is satisfied.

The dispenser component 270 enables the kiosk system 200 to dispense or serve a good to a consumer 122. In some embodiments, the dispenser component 270 communicates (e.g., via the interface component 210) with the transaction component 260 to determine or identify whether to serve the good. For example, the dispenser component 270 may serve a beverage upon receiving an indication that the request for authorization is approved or upon receiving an indication that the financial transaction is authorized. In some embodiments, the dispenser component 270 serves the good based on one or more user metrics 124 and/or one or more account metrics 126.

In some embodiments, the good (e.g., a beverage) is dispensed with a security mechanism that enables the beverage to be accessible or consumable upon identifying authorized biometric data. For example, the dispenser component 270 applies a sealing mechanism to the beverage that controls access to the beverage. The sealing mechanism may restrict access to the beverage until presented with authorized biometric data. Upon identifying authorized biometric data (e.g., scan data 134), the sealing mechanism may allow access to the beverage.

Figure 3:
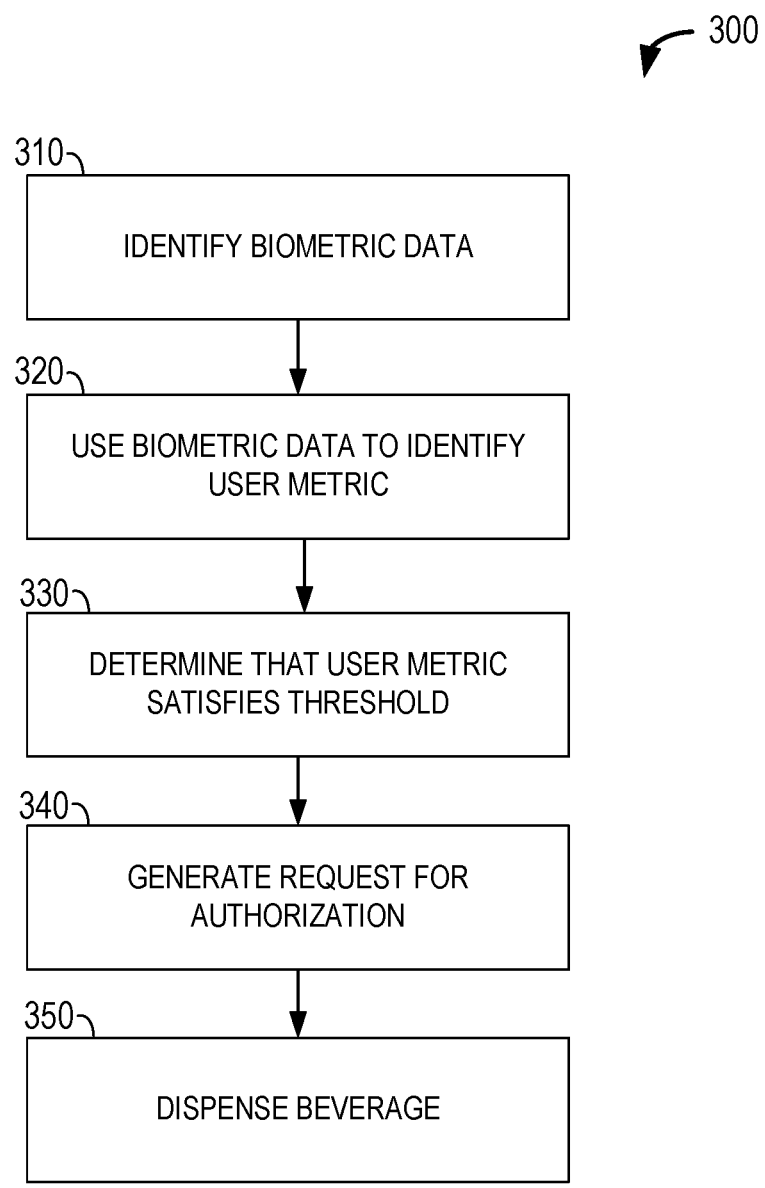
FIG. 3 is a flowchart of an example method for providing a customized or tailored user experience.

FIG. 3 is a flowchart of an example method 300 for providing a customized or tailored user experience in the environment 100 (shown in FIG. 1). The method 300 may be performed or implemented using, for example, the system 110 (shown in FIG. 1), the kiosk 120 (shown in FIG. 1), or the kiosk system 200 (shown in FIG. 2) to facilitate providing a customized menu including a set or subset of goods tailored to the consumer 122. Biometric data (e.g., scan data 134) is identified at 310. The biometric data may be generated at a scanner component 220 that is integrated or included in the kiosk 120. Alternatively, at least some portions of the scanner component 220 configured to generate scan data 134 may be at a remote or discrete device coupled to the kiosk 120, and the kiosk 120 may identify the biometric data upon receiving the scan data 134 from the remote or discrete device.

The biometric data is used at 320 to identify a user metric 124 and/or account metric 126. For example, the biometric data may be used to communicate with one or more computing devices or data storage devices to obtain other data that may be identified as a user metric 124 and/or account metric 126 and/or be used to calculate a user metric 124 and/or account metric 126. In some embodiments, the user metric 124 and/or account metric 126 is identified at a metric component 230 that includes, stores, or has access to other data (e.g., demographic data, cardholder data, loyalty account data, tables) that enables at least some user metrics 124 and/or account metrics 126 to be identified. The metric component 230 may be integrated or included in the kiosk 120.

It is determined at 330 whether the user metric 124 and/or account metric 126 satisfies a predetermined threshold. For example, a set of indicators corresponding to one or more goods that may be provided to the consumer 122 may be identified based on the user metric 124, account metric 126, and/or predetermined threshold. The indicators and/or corresponding goods may be identified based on a variety of factors or characteristics including, for example, an age, a gender, a body weight, a BAC, a quantity of beverages, a period of time, an inventory level, a price, an account balance, an available credit line, a user preference, a transaction history, a rewards history, and the like.

When the user metric 124 and/or account metric 126 satisfies the predetermined threshold, the set of indicators corresponding to one or more goods that may be provided to the consumer 122 is presented at a customized menu using a presentation component 240. The presentation component 240 may be integrated or included in the kiosk 120. Alternatively, at least some portions of the presentation component 240 configured to present data to the consumer 122 may be at a remote or discrete device coupled to the kiosk 120. The consumer 122 may select or identify a desired good (e.g., a beverage) from the set of indicators (e.g., the customized menu) at the presentation component 240.

In response to receiving the selection, the kiosk 120 generates at 340 a request for authorization for a financial transaction associated with the desired good. In some embodiments, the request for authorization is generated at a transaction component 260 using a cardholder account 132 that is determined or identified based on the biometric data. The transaction component 260 may be integrated or included in the kiosk 120. If the financial transaction is authorized, the desired good may be provided or dispensed at 350 at or by the kiosk 120. In some embodiments, a dispenser component 270 receives an approval of the request for authorization and, in response to receiving the approval, dispenses the desired good.

In some embodiments, the dispenser component 270 includes a scanner device that enables the dispenser component 270 to detect a position of an object (e.g., a cup, a sleeve configured to retain the cup), and dispense the desired good upon determining whether the position satisfies a predetermined threshold (e.g., the object is positioned proximate the dispenser component 270, the object is positioned such that the good may be dispensed in an efficient manner). The dispenser component 270 may be integrated or included in the kiosk 120. Alternatively, at least some portions of the dispenser component 270 configured to dispense at least some goods may be at a remote or discrete device coupled to the kiosk 120.

Figure 4:
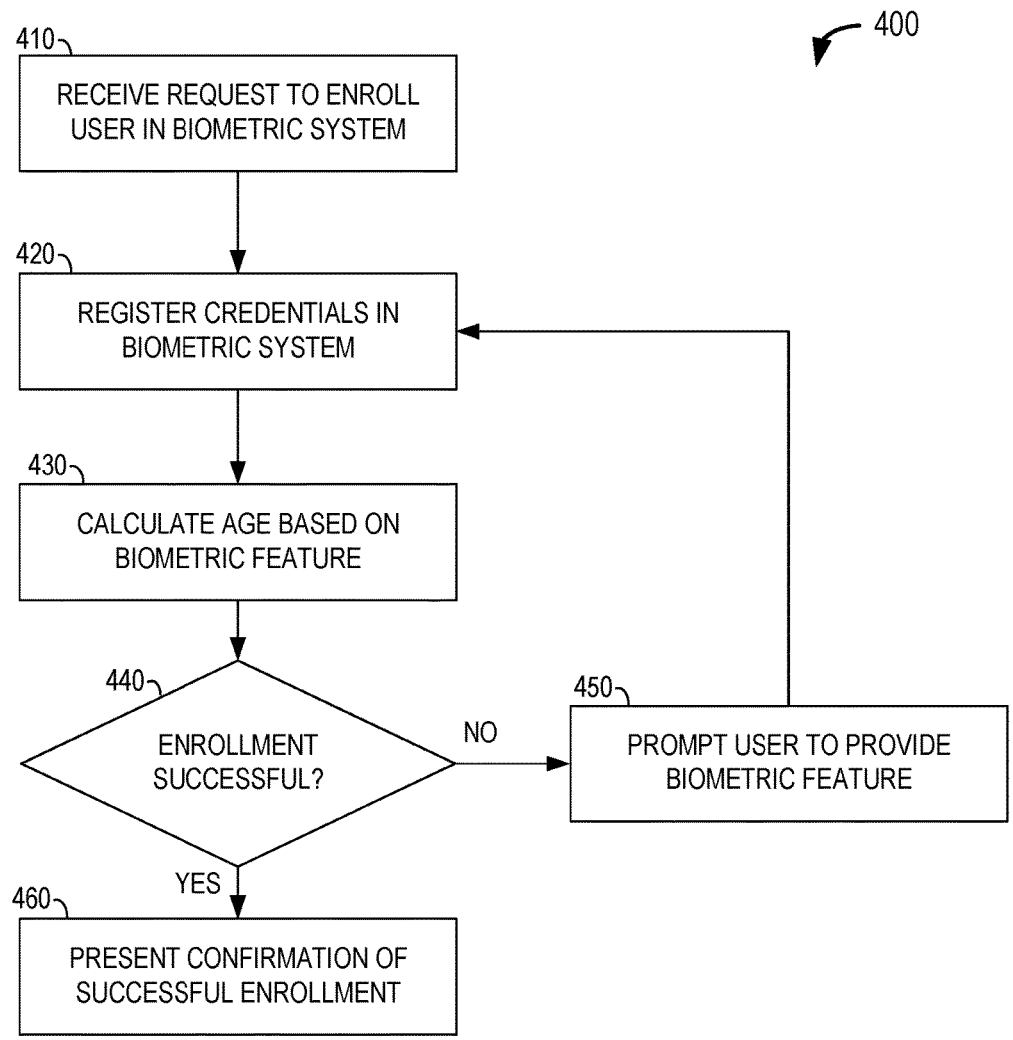
FIG. 4 is a flowchart of an example method for enrolling in a biometric system.

FIG. 4 is a flowchart of an example method 400 for enrolling one or more users in a biometric system 140. A request to enroll a user (e.g., consumer 122) in the biometric system 140 is received at 410. The request may include, for example, user identifier data 142, scan data 134, and/or any other data that may be associated with a user.

The scan data 134 is authenticated or verified to be associated with the user. Upon authenticating the scan data 134, the scan data 134 is registered at 420 in the biometric system 140 such that the scan data 134 may be identified as a registered credential 144. In some embodiments, an age is automatically calculated based on the registered credential 144. Additionally or alternatively, the biometric system 140 may prompt the user to provide an age and/or a birthdate, and register the received input as the age and/or birthdate, respectively.

It is determined at 440 whether the user has been successfully enrolled. If the user has been successfully enrolled, the biometric system 140 may present confirmation of successful enrollment and/or transmit data to the kiosk 120 to enable the kiosk 120 to present the confirmation using, for example, a presentation component 240. On the other hand, if the user has not been successfully enrolled, the biometric system 140 may prompt at 450 the user to re-provide scan data 134 (or provide new scan data 134) and/or transmit data to the kiosk 120 to enable the kiosk 120 to prompt the user using, for example, the presentation component 240.

Figure 5:
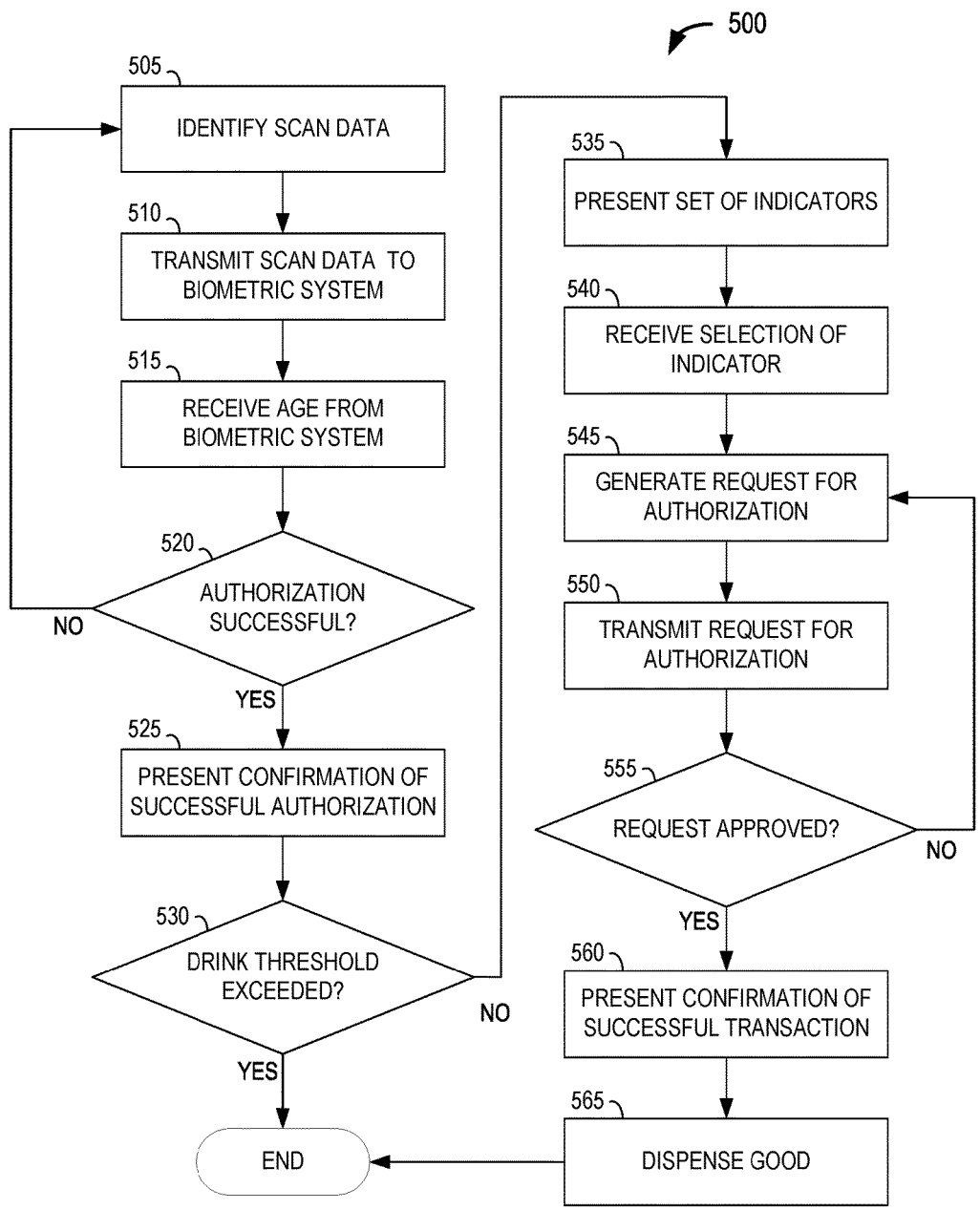
FIG. 5 is a detailed flowchart of an example method for providing a customized or tailored user experience, such as the method shown in FIG. 3.

FIG. 5 is a detailed flowchart of an example method 500 for providing a customized or tailored user experience in the environment 100 (shown in FIG. 1). In some embodiments, the kiosk 120 detects or identifies that a user (e.g., consumer 122) is entering or attempting to enter a controlled area. The area may be a physical area around the kiosk 120 and/or a virtual area presented using, for example, the presentation component 240 (e.g., a screen that allows the user to purchase an alcoholic beverage). Upon detecting the user, the kiosk 120 may perform a scan for biometric data.

Scan data 134 associated with the user is identified at 505 and transmitted at 510 to a biometric system 140. The biometric system 140 may, for example, identify a registered credential 144 corresponding to the scan data 134, and transmit user identifier data 142 and/or other data (e.g., an age) associated with the registered credential 144 to the kiosk 120. The data (e.g., user identifier data 142, age) is received at 515 from the biometric system 140, and it is determined at 520 whether the user is authorized to proceed with the transaction.

In some embodiments, the user is authorized to proceed with the transaction with a user metric 124 and/or account metric 126 associated with the user satisfies a predetermined threshold. For example, the kiosk 120 may determine whether the user is an authorized user (e.g., the user is associated with user identifier data 142 recognized by the kiosk 120, the user is of an authorized age). If the age received from the biometric system 140 is not a current age of the user (e.g., an age at the time of enrollment or registration), the kiosk 120 may calculate the present age of the user based on a present date, a date of the age received from the biometric system 140, and/or a birthday of the user.

If the user is not authorized to proceed (e.g., the authorization was not successful), the user may re-provide scan data 134 (or provide new scan data 134) and/or pursue an alternate form of authentication (e.g., by presenting a government-issued identification) to proceed with the transaction. On the other hand, if the user is authorized to proceed, a confirmation of successful authorization is presented at 525 using, for example, a presentation component 240. In some embodiments, it is determined at 530 whether a drink threshold has been exceeded. For example, it may be determined whether a quantity of alcoholic beverages provided to the user and/or an estimated BAC of the user (e.g., user metric 124, account metric 126) satisfies a predetermined threshold. If the drink threshold has been exceeded, the user may proceed with another transaction (e.g., a transaction associated with a non-alcoholic beverage, a transaction associated with a transportation service). On the other hand, if the drink threshold has not been exceeded, a set of indicators corresponding to one or more goods that may be provided to the user is presented at 535 using, for example, the presentation component 240.

In response to receiving at 540 a selection of an indicator (e.g., user input), a request for authorization for a financial transaction associated with the selected indicator is generated 545 and transmitted at 550 to a system server 130. It is determined at 555 whether the request is approved. If the request is approved, a confirmation of successful transaction is presented at 560 using, for example, the presentation component 240, and a good corresponding to the selection is dispensed at 565. On the other hand, if the request is not approved, the user may provide new data for proceeding with the transaction and/or provide an alternate form of payment.

Figure 6:
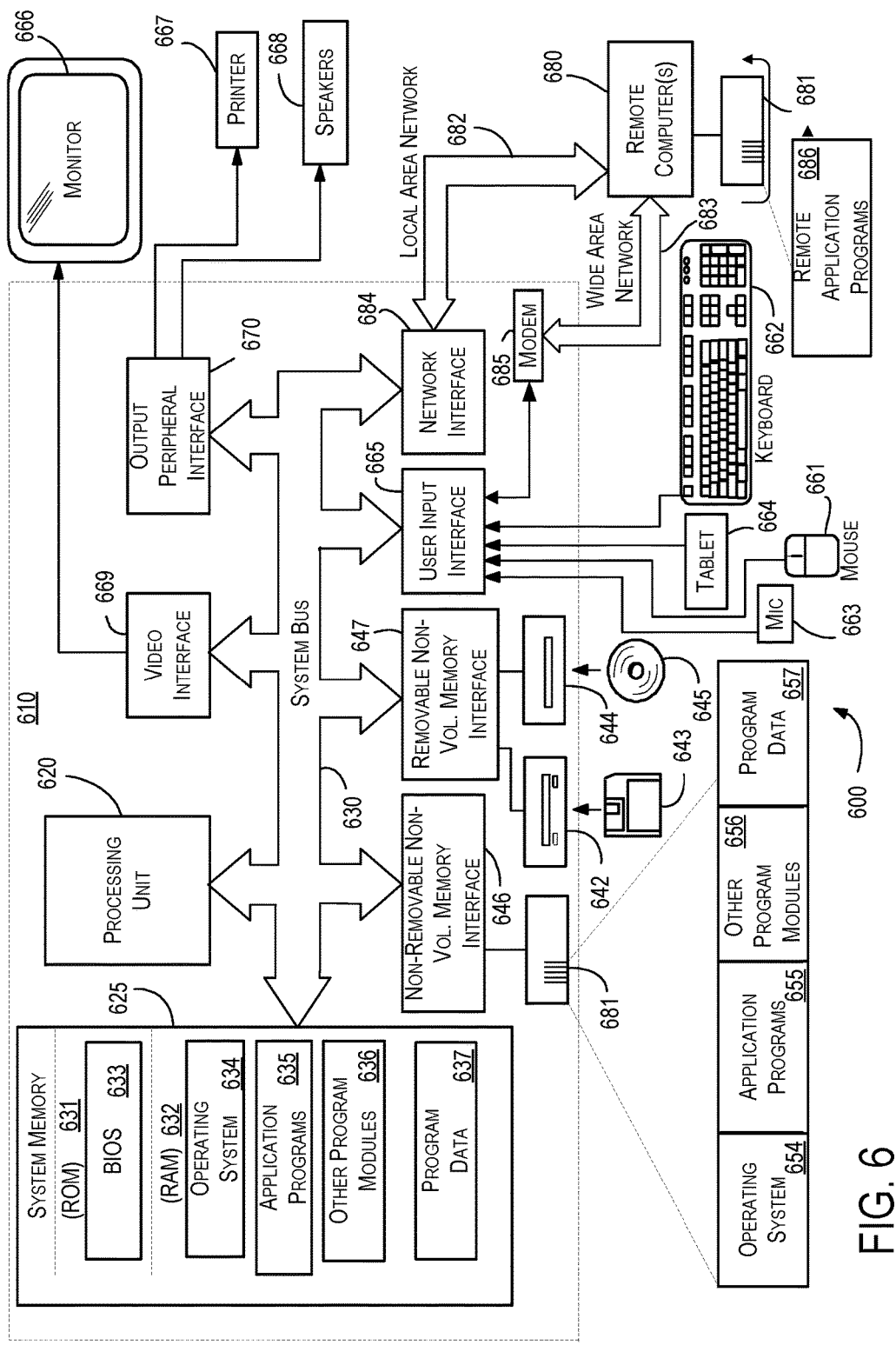
FIG. 6 is a block diagram of an example operating environment for providing a customized or tailored user experience.

FIG. 6 is a block diagram of an example operating environment 600 that may be used to provide a customized or tailored user experience. The operating environment 600 is only one example of a computing and networking environment and is not intended to suggest any limitation as to the scope of use or functionality of the disclosure. The operating environment 600 should not be interpreted as having any dependency or requirement relating to any one or combination of components illustrated in the example operating environment 600.

The disclosure is operational with numerous other computing and networking environments or configurations. While some examples of the disclosure are illustrated and described herein with reference to the operating environment 600 being or including the system 110 (shown in FIG. 1), the kiosk 120 (shown in FIG. 1), or the kiosk system 200 (shown in FIG. 2), aspects of the disclosure are operable with any computing device (e.g., system server 130, biometric system 140, consumer loyalty system 150, interface component 210, scanner component 220, metric component 230, presentation component 240, monitor component 250, transaction component 260, dispenser component 270) that executes instructions to implement the operations and functionality associated with the operating environment 600.

For example, the operating environment 600 may include a mobile device, a mobile telephone, a phablet, a tablet, a portable media player, a netbook, a laptop, a desktop computer, a personal computer, a server computer, a computing pad, a kiosk, a tabletop device, an industrial control device, a multiprocessor system, a microprocessor-based system, a set top box, programmable consumer electronics, a network computer, a minicomputer, a mainframe computer, a distributed computing environment that include any of the above systems or devices, and the like. The operating environment 600 may represent a group of processing units or other computing devices. Additionally, any computing device described herein may be configured to perform any operation described herein including one or more operations described herein as being performed by another computing device.

With reference to FIG. 6, an example system for implementing various aspects of the disclosure may include a general purpose computing device in the form of a computer 610. Components of the computer 610 may include, but are not limited to, a processing unit 620 (e.g., a processor), a system memory 625 (e.g., a computer-readable storage device), and a system bus 630 that couples various system components including the system memory 625 to the processing unit 620. The system bus 630 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 625 includes any quantity of media associated with or accessible by the processing unit 620. For example, the system memory 625 may include computer storage media in the form of volatile and/or nonvolatile memory such as read only memory (ROM) 631 and random access memory (RAM) 632. The ROM 631 may store a basic input/output system 633 (BIOS) that facilitates transferring information between elements within computer 610, such as during start-up. The RAM 632 may contain data and/or program modules that are immediately accessible to and/or presently being operated on by processing unit 620. For example, the system memory 625 may store computer-executable instructions, communication data, authentication data, application data, and other data.

The processing unit 620 may be programmed to execute the computer-executable instructions for implementing aspects of the disclosure, such as those illustrated in the figures (e.g., FIGS. 3-5). By way of example, and not limitation, FIG. 6 illustrates operating system 634, application programs 635, other program modules 636, and program data 637. The processing unit 620 includes any quantity of processing units, and the instructions may be performed by the processing unit 620 or by multiple processors within the operating environment 600 or performed by a processor external to the operating environment 600.

The system memory 625 may include computer-executable instructions, tables, demographic data, biometric data, user identifier data 142, user metrics 124, account metrics 126, financial account data, cardholder data, loyalty account data, and other data. For example, the system memory 625 may include an interface component 210 (shown in FIG. 2), a scanner component 220 (shown in FIG. 2), a metric component 230 (shown in FIG. 2), a presentation component 240 (shown in FIG. 2), a monitor component 250 (shown in FIG. 2), a transaction component 260 (shown in FIG. 2), and/or a dispenser component 270 (shown in FIG. 2) for implementing aspects of the disclosure.

Upon programming or execution of these components, the operating environment 600 and/or processing unit 620 is transformed into a special purpose microprocessor or machine. For example, the scanner component 220, when executed by the processing unit 620, causes the processing unit 620 to detect an object, scan for biometric data, and/or identify biometric data; the metric component 230, when executed by the processing unit 620, causes the processing unit 620 to transmit biometric data to a biometric system 140 (e.g., via the interface component 210), receive user identifier data 142 from the biometric system 140 (e.g., via the interface component 210), identify user identifier data 142 based on biometric data, identify a user metric 124, and/or identify an account metric 126; the presentation component 240, when executed by the processing unit 620, causes the processing unit 620 to determine whether a user metric 124 satisfies a predetermined threshold, determine whether the account metric 126 satisfies a predetermined threshold, identify a set of beverage indicators for presentation, and/or receive user input corresponding to one beverage indicator (e.g., via the interface component 210); the monitor component 250, when executed by the processing unit 620, causes the processing unit 620 to identify an inventory level associated with a beverage, and/or adjust a price associated with the beverage based on the inventory level; the transaction component 260, when executed by the processing unit 620, causes the processing unit 620 to transmit user identifier data 142 to a transaction processing device (e.g., via the interface component 210), receive data associated with a financial account from the transaction processing device (e.g., via the interface component 210), identify the financial account corresponding to user identifier data 142, determine whether a user metric 124 satisfies a predetermined threshold, and/or generate a request for authorization for a financial transaction using the financial account; and the dispenser component 270, when executed by the processing unit 620, causes the processing unit 620 to determine whether to dispense a beverage and/or apply a sealing mechanism to the beverage. Although the processing unit 620 is shown separate from the system memory 625, embodiments of the disclosure contemplate that the system memory 625 may be onboard the processing unit 620 such as in some embedded systems.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 642 that reads from or writes to a removable, nonvolatile magnetic disk 643 (e.g., a floppy disk, a tape cassette), and an optical disk drive 644 that reads from or writes to a removable, nonvolatile optical disk 645 (e.g., a compact disc (CD), a digital versatile disc (DVD)). Other removable/non-removable, volatile/nonvolatile computer storage media that may be used in the example operating environment include, but are not limited to, flash memory cards, digital video tape, solid state RAM, solid state ROM, and the like. The hard disk drive 641 may be connected to the system bus 630 through a non-removable memory interface such as interface 646, and magnetic disk drive 642 and optical disk drive 644 may be connected to the system bus 630 by a removable memory interface, such as interface 647.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 654, application programs 655, other program modules 656 and program data 657. Note that these components may either be the same as or different from operating system 634, application programs 635, other program modules 636, and program data 637. Operating system 654, application programs 655, other program modules 656, and program data 657 are given different numbers herein to illustrate that, at a minimum, they are different copies.

The computer 610 includes a variety of computer-readable media. Computer-readable media may be any available media that may be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 631 and RAM 632 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 610. Computer storage media are implemented in hardware and exclude carrier waves and propagated signals. Any such computer storage media may be part of computer 610.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 610 through one or more input devices, such as a pointing device 661 (e.g., mouse, trackball, touch pad), a keyboard 662, a microphone 663, and/or an electronic digitizer 664 (e.g., tablet). Other input devices not shown in FIG. 6 may include a joystick, a game pad, a controller, a satellite dish, a camera, a scanner, an accelerometer, or the like. These and other input devices may be coupled to the processing unit 620 through a user input interface 665 that is coupled to the system bus 630, but may be connected by other interface and bus structures, such as a parallel port, game port or a universal serial bus (USB).

Information, such as text, images, audio, video, graphics, alerts, and the like, may be presented to a user via one or more presentation devices, such as a monitor 666, a printer 667, and/or a speaker 668. Other presentation devices not shown in FIG. 6 may include a projector, a vibrating component, or the like. These and other presentation devices may be coupled to the processing unit 620 through a video interface 669 (e.g., for a monitor 666 or a projector) and/or an output peripheral interface 670 (e.g., for a printer 667, a speaker 668, and/or a vibration component) that are coupled to the system bus 630, but may be connected by other interface and bus structures, such as a parallel port, game port or a USB. In some embodiments, the presentation device is integrated with an input device configured to receive information from the user (e.g., a capacitive touchscreen panel, a controller including a vibrating component). Note that the monitor 666 and/or touch screen panel may be physically coupled to a housing in which the computer 610 is incorporated, such as in a tablet-type personal computer.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 682 and one or more wide area networks (WAN) 683, but may also include other networks. Such networking environments are commonplace in offices, enterprise-wide computer networks, intranets and the Internet.

When used in a LAN networking environment, the computer 610 is coupled to the LAN 682 through a network interface or adapter 684. When used in a WAN networking environment, the computer 610 may include a modem 685 or other means for establishing communications over the WAN 683, such as the Internet. The modem 685, which may be internal or external, may be connected to the system bus 630 via the user input interface 665 or other appropriate mechanism. A wireless networking component such as comprising an interface and antenna may be coupled through a device such as an access point or peer computer to a LAN 682 or WAN 683. In a networked environment, program modules depicted relative to the computer 610, or portions thereof, may be stored in the remote memory storage device. By way of example, and not limitation, FIG. 6 illustrates remote application programs 686 as residing on memory storage device 681. It may be appreciated that the network connections shown are examples and other means of establishing a communications link between the computers may be used.

The block diagram of FIG. 6 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 6 may be performed by other elements in FIG. 6, or an entity (e.g., processor, web service, server, applications, computing device, etc.) not shown in FIG. 6.

Figure 7:
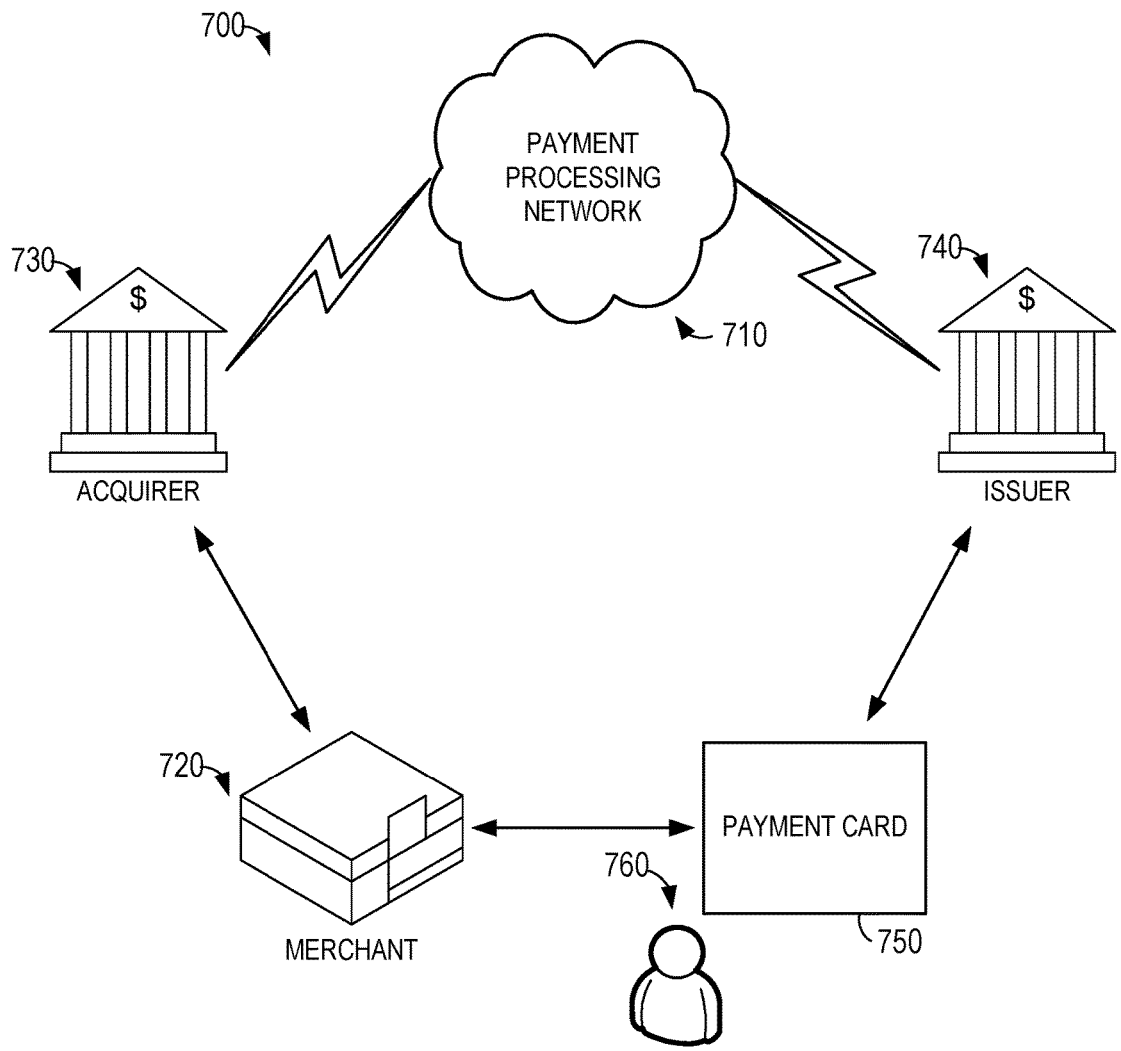
FIG. 7 is a block diagram illustrating an example environment for processing financial transactions.

FIG. 7 is a block diagram illustrating an example system or environment 700 for providing a customized or tailored user experience. The system 110 (shown in FIG. 1), the kiosk 120 (shown in FIG. 1), and/or the kiosk system 200 (shown in FIG. 2), for example, may provide the tailored user experience in the environment 700. The environment 700 includes a processing network 710, such as the MASTERCARD® brand payment processing network (MASTERCARD® is a registered trademark of MasterCard International Incorporated located in Purchase, NY). The MASTERCARD® brand payment processing network is a propriety network for exchanging financial transaction data between members of the MASTERCARD® brand payment processing network.

The environment 700 includes one or more merchants 720 that accept payment via the processing network 710. For example, payment may be accepted at the system 110, the kiosk 120, and/or the kiosk system 200. To accept payment via the processing network 710, the merchant 720 establishes a financial account with an acquirer 730 that is a member of the processing network 710. The acquirer 730 is a financial institution that maintains a relationship with one or more merchants 720 to enable the merchants 720 to accept payment via the processing network 710. The acquirer 730 may also be known as an acquiring bank, a processing bank, or a merchant bank.

The environment 700 includes one or more issuers 740 that issue or provide payment cards 750 (e.g., credit card, debit card, prepaid card, and the like) or other payment products to one or more cardholders 760 or, more broadly, account holders ("cardholder" and "account holder" may be used interchangeably herein). The issuer 740 is a financial institution that maintains a relationship with one or more cardholders 760 to enable the cardholders 760 to make a payment using the payment card 750 via the processing network 710.

A cardholder 760 uses a payment product, such as a payment card 750, to purchase a good or service from a merchant 720. In some embodiments, the payment card 750 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 750 to purchase a good or service from a merchant 720. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 760 may use any payment product that is linked or associated with a corresponding financial account maintained by an issuer 740. As described herein, the term "payment card" includes credit cards, debit cards, prepaid cards, digital cards, smart cards, and any other payment product that is linked or associated with a corresponding financial account maintained by an issuer 740. Payment cards 750 may have any shape, size, or configuration that enables the environment 700 to function as described herein.

A cardholder 760 may present the merchant 720 with a payment card 750 to make a payment to the merchant 720 in exchange for a good or service. Alternatively, the cardholder 760 may provide the merchant 720 with account information associated with the payment card 750 without physically presenting the payment card 750 (e.g., for remote financial transactions, including e-commerce transactions, card-not-present transactions, or card-on-file transactions). Account information may include a name of the cardholder 760, an account number, an expiration date, a security code (such as a card verification value (CVV), a card verification code (CVC), and the like), and/or a personal identification number (PIN).

The merchant 720 requests authorization from an acquirer 730 for at least the amount of the purchase. The merchant 720 may request authorization using any financial transaction computing device configured to transmit account information of the cardholder 760 to one or more financial transaction processing computing devices of the acquirer 730. For example, the merchant 720 may request authorization through a point-of-sale (POS) terminal, which reads account information of the cardholder 760 from a microchip or magnetic stripe on the payment card 750, and transmits the cardholder's account information to the one or more financial transaction processing computing devices of the acquirer 730. For another example, the POS terminal reads account information of the cardholder 760 from a device configured to communicate with the POS terminal using contactless payment technology, and transmits the cardholder's account information to one or more financial transaction processing computing devices of the acquirer 730.

Using the processing network 710, the financial transaction processing computing devices of the acquirer 730 communicate with one or more financial transaction processing computing devices of an issuer 740 to determine whether the account information of the cardholder 760 matches or corresponds to the account information of the issuer 740, whether the account is in good standing, and/or whether the purchase is covered by (e.g., less than) a credit line or account balance associated with the financial account. Based on these determinations, the financial transaction processing computing devices of the issuer 740 determine whether to approve or decline the request for authorization from the merchant 720.

If the request for authorization is declined, the merchant 720 is notified as such, and may request authorization from the acquirer 730 for a lesser amount or request an alternative form of payment from the cardholder 760. If the request for authorization is approved, an authorization code is issued to the merchant 720, and the cardholder's available credit line or account balance is decreased. The financial transaction is then settled between the merchant 720, the acquirer 730, the issuer 740, and/or the cardholder 760. Settlement typically includes the acquirer 730 reimbursing the merchant 720 for selling the good or service, and the issuer 740 reimbursing the acquirer 730 for reimbursing the merchant 720. When a credit card is used, the issuer 740 may bill the cardholder 760 to settle a financial account associated with the cardholder 760. When a debit or prepaid card is used, the issuer 740 may automatically withdraw funds from the account.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for providing a customized or tailored user experience. For example, the elements illustrated in FIG. 1, 2, 6, or 7 such as when encoded to perform the operations illustrated in FIG. 3, 4, or 5 constitute at least an example means for identifying biometric data (e.g., scanner component 220), an example means for using the identified biometric data to identify a user metric 124 (e.g., metric component 230), an example means for determining whether the user metric 124 satisfies a predetermined threshold (e.g., presentation component 240), an example means for generating a request for authorization for a financial transaction (e.g., transaction component 260), and/or an example means for dispensing the beverage (e.g., dispenser component 270).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A kiosk system for automatically dispensing a beverage, the kiosk system comprising one or more processors configured to act as:
    a scanner component to identify biometric data;
    a metric component to communicate with the scanner component to identify user identifier data of a user based on the identified biometric data;
    a transaction component to communicate with the metric component to identify a financial account corresponding to the identified user identifier data, and generate a request for authorization for a financial transaction using the identified financial account; and
    a dispenser component to dispense the beverage based on authorization received in response to the request generated by the transaction component, wherein the beverage is dispensed with a security mechanism configured to allow the beverage to be consumed by the user upon the user furnishing authorized biometric data.

2. The kiosk system of claim 1, wherein the beverage is dispensed based on estimated blood alcohol content of the user.

3. The kiosk system of claim 1, wherein the metric component is configured to transmit the biometric data to a biometric system, and receive the user identifier data from the biometric system.

4. The kiosk system of claim 1, wherein the metric component is configured to identify a user metric, wherein the one or more processors are further configured to act as a presentation component to determine whether the user metric satisfies a threshold, and identify a set of beverage indicators for presentation using the presentation component on condition that the threshold is satisfied.

5. The kiosk system of claim 1, wherein the metric component is configured to identify an account metric, wherein the one or more processors are further configured to act as a presentation component to determine whether the account metric satisfies a threshold, and identify a set of beverage indicators for presentation using the presentation component on condition that the threshold is satisfied.

6. The kiosk system of claim 1 wherein the one or more processors are further configured to act as a presentation component to identify a set of beverage indicators for presentation using the presentation component, and receive user input corresponding to one beverage indicator of the set of beverage indicators, the one beverage indicator associated with the beverage.

7. The kiosk system of claim 1, wherein the one or more processors are further configured to act as a monitor component to identify an inventory level associated with the beverage, and adjust a price associated with the beverage based on the inventory level.

8. The kiosk system of claim 1, wherein the transaction component is configured to transmit the user identifier data to a transaction processing device, and receive data associated with the financial account from the transaction processing device.

9. The kiosk system of claim 1, wherein the metric component is configured to use the user identifier data to identify a user metric, and the transaction component is configured to determine whether the user metric satisfies a threshold, wherein the request for authorization is generated on condition that the threshold is satisfied.

10. The kiosk system of claim 1, wherein the dispenser component is configured to apply a sealing mechanism to the beverage.

11. A computer-implemented method for dispensing a beverage, the computer-implemented method comprising:
    identifying, by one or more processors configured to act as a scanner component, biometric data;
    using the identified biometric data to identify a user metric;
    determining whether the user metric satisfies a first threshold;
    on condition that the user metric satisfies the first threshold, generating a request for authorization for a financial transaction, the financial transaction being associated with the beverage; and
    on condition that the financial transaction is authorized, dispensing the beverage with a security mechanism configured to allow the beverage to be consumed by a user upon the user furnishing authorized biometric data.

12. The computer-implemented method of claim 11 further comprising:
    detecting an object; and
    upon detecting the object, scanning the object for the biometric data.

13. The computer-implemented method of claim 11 further comprising identifying user identifier data corresponding to the biometric data, the user metric identified based on the user identifier data.

14. The computer-implemented method of claim 11 further comprising:
    transmitting, to a biometric system, the biometric data; and
    receiving, from the biometric system, user identifier data, the user metric identified based on the user identifier data.

15. The computer-implemented method of claim 11 further comprising:
  identifying a set of beverage indicators for presentation using the one or more processors further configured to act as a presentation component; and
  receiving, at the presentation component, user input corresponding to one beverage indicator of the set of beverage indicators, the request for authorization associated with the one beverage indicator.

16. The computer-implemented method of claim 11 further comprising:
  identifying an account metric corresponding to the biometric data; and
  determining whether the account metric satisfies a second predetermined threshold, wherein the request for authorization is generated on condition that the account metric satisfies the second predetermined threshold.

17. The computer-implemented method of claim 11 further comprising:
  using the biometric data to identify a financial account;
  transmitting, to a transaction processing device, the request for authorization, the request for authorization associated with the financial account; and
  receiving, from the transaction processing device, an indication that the financial transaction is authorized.

18. The computer-implemented method of claim 11, wherein the beverage is dispensed based on estimated blood alcohol content of the user.

19. A system for use in dispensing a beverage, the system comprising:
  one or more processors; and
  one or more computer-readable storage devices storing computer-executable instructions and data associated with one or more cardholder accounts, wherein, upon execution by at least one processor of the one or more processors, the computer-executable instructions cause the at least one processor to:
  identify scan data;
  use the identified scan data to identify a user metric;
  identify financial account data;
  use the identified financial account data to identify an account metric;
  on condition that the user metric satisfies a first threshold and the account metric satisfies a second threshold, identify, from the one or more cardholder accounts, a cardholder account based on the scan data;
  determine whether to authorize a financial transaction using the identified cardholder account, the financial transaction being associated with the beverage; and
  on condition that the financial transaction is authorized, transmit an instruction to dispense the beverage, wherein the beverage is dispensed with a security mechanism configured to allow the beverage to be consumed by the user upon the user furnishing authorized biometric data.

20. The system of claim 19, wherein the computer-executable instructions further cause the at least one processor to:
  dispense the beverage based on estimated blood alcohol content of the user.

* * * * *